United States Patent
Willis et al.

(10) Patent No.: US 8,235,814 B2
(45) Date of Patent: Aug. 7, 2012

(54) IMPRESSION NORMALIZATION

(75) Inventors: Daniel Willis, Gilroy, CA (US); Michael Doiron, Nepean (CA)

(73) Assignee: Google Inc., Mountain View, CA (US)

( * ) Notice: Subject to any disclaimer, the term of this patent is extended or adjusted under 35 U.S.C. 154(b) by 515 days.

(21) Appl. No.: 12/334,014

(22) Filed: Dec. 12, 2008

(65) Prior Publication Data

US 2009/0186695 A1    Jul. 23, 2009

Related U.S. Application Data

(60) Provisional application No. 61/013,594, filed on Dec. 13, 2007.

(51) Int. Cl.
*G06Q 30/00* (2006.01)
(52) U.S. Cl. ............................. 463/31; 705/28
(58) Field of Classification Search .................. 705/28, 705/37; 463/31
See application file for complete search history.

(56) References Cited

U.S. PATENT DOCUMENTS

| | | | |
|---|---|---|---|
| 7,136,871 B2 | 11/2006 | Ozer et al. | |
| 2006/0095281 A1* | 5/2006 | Chickering et al. | 705/1 |
| 2006/0224455 A1* | 10/2006 | Willis et al. | 705/14 |
| 2007/0198327 A1* | 8/2007 | Yazdani et al. | 705/10 |
| 2008/0102947 A1 | 5/2008 | Hays et al. | |
| 2009/0144140 A1 | 6/2009 | Willis et al. | |

FOREIGN PATENT DOCUMENTS

| | | |
|---|---|---|
| KR | 10-2007-0067005 | 6/2007 |
| KR | 10-2007-0067021 | 6/2007 |
| WO | WO 2005086969 A2 * | 9/2005 |

OTHER PUBLICATIONS

International Search Report and Written Opinion mailed Jul. 27, 2009 in International application No. PCT/US2008/086636.
Authorized officer Jae Gwi Choi, International Search Report and Written Opinion in PCT/US2008/085015, mailed Apr. 29, 2009, 11 pages.
Authorized officer Beate Giffo-Schmitt, International Preliminary Report on Patentability in PCT/US2008/085015, mailed Jun. 10, 2010, 7 pages.
Authorized officer Athina Nickitas-Etienne, International Preliminary Report on Patentability in PCT/US2008/086636, mailed Jun. 24, 2010, 11 pages.

* cited by examiner

*Primary Examiner* — Thomas L Dickey
(74) *Attorney, Agent, or Firm* — Fish & Richardson P.C.

(57) ABSTRACT

An impression normalization function can be established and applied against recorded values for impressions occurring in two or more games. A normalized impression record is created to provide advertisers independent and realistic measurements by which they can compare impressions to enable agreement on the degree of exposure offered by a given advertisement.

18 Claims, 3 Drawing Sheets

| Impression Criteria | Reference Value | Recorded Value | Normalized Value |
|---|---|---|---|
| Impression Length | 40 | 20 | 15 |
| Percentage of Screen Occupied by Ad | 60 | 45 | 45 |
| Percentage of Ad Occlusion | 40 | 40 | 40 |
| Quality of Ad Impression | 3 | 3 | 3 |
| Angle of Vision | 50 | 50 | 50 |

IMPRESSION NORMALIZATION

RELATED APPLICATION DATA

The present application claims priority to U.S. Provisional Application Ser. No. 61/013,594, titled "Impression Normalization", filed on Dec. 13, 2007, the contents of which are incorporated by reference as if set forth fully herein.

FIELD

This document relates to information presentation.

BACKGROUND

During recent years, computer gaming has gained increasing popularity, and today many players play games all around the world. Interactive computer gaming, such as on Internet enabled platforms, has blurred the line between games and other entertainment or communication media.

Due to their dynamic nature and specific appeal to certain audiences, computer games and especially games played on Internet-enabled platforms provide an ideal vehicle for sponsored content delivery (e.g., advertising). Not only is it possible for an advertiser to target directly a specific group of customers, but also advertisements ("ads") can be incorporated directly into the computer games, enabling something akin to the well-known concept of product placement. In one such system, a game is running on a computer that is connected to the Internet. While playing of the game, the game software contacts one or more content providers, either locally or remotely (e.g., advertising servers) to retrieve advertising content that is available for display to the gamer during game play. The data and advertising content is transferred using, for example, HTTP protocols over the Internet.

When an ad is included in video games, a question to be resolved is how to compare ad impressions in different games, on different platforms, with different content display techniques.

SUMMARY

This specification describes systems, methods and computer program products whereby a centralized impression normalization function can be established and applied against recorded values for impressions occurring in two or more games. A normalized impression record is created to provide advertisers independent and realistic measurements by which they can compare impressions to enable agreement on the degree of exposure offered by a given advertisement.

In general, one aspect of the subject matter described in this specification can be embodied in methods that include the actions of identifying impression data associated with the display of content during the execution of at least one game, identifying a normalization function, and generating normalized impression data based on the application of the normalization function to the identified impression data.

These and other embodiments permit the implementation of a centralized impression normalization function that ensures that participants in the in-game advertising value chain are receiving good return on their investment (ROI).

DETAILED DESCRIPTION

When content (e.g., an advertisement) is displayed within one or more games, whether or not the display of the content is equivalent to one or more other displays of content can vary because of the variability of gaming environments. Video game play can involve virtual worlds/universes. However, factors and environmental issues that exist in the real world can also play a part in the impressions in virtual worlds.

For instance, consider the example of a game in which someone drives on a racetrack, repeatedly passing by the same advertising billboard on the side of the track. Details of the advertisement may become readable for a brief moment (e.g., 1 second) just as a driver passes by the billboard at a high rate of speed. As a result, there may be a large number of brief views of the advertisement. Contrast that example with a game in which a user in a three dimensional environment can interact with an advertisement, such as a product placement within the game. The interaction may occur only once in the game, but the length of the observed impression and the level of the user's interaction with the advertisement may be significant. The question, therefore, is how can these advertising impressions be compared so that advertisers can understand the significance of each in terms of ROI for their display.

The present specification describes a solution in which content (e.g., ad) impressions within one or more games, regardless of game platform, game genre, and type of play, geo-location of users, etc., are normalized to permit advertisers measurements by which they can compare impressions to enable agreement on the degree of exposure offered by a given advertisement. This enables advertisers to better understand their ROI for a given advertisement or campaign. Additionally, the ability to understand and therefore optimize ROI translates to greater advertising efficiencies, potentially leading to an overall savings for an advertiser.

Figure 1:
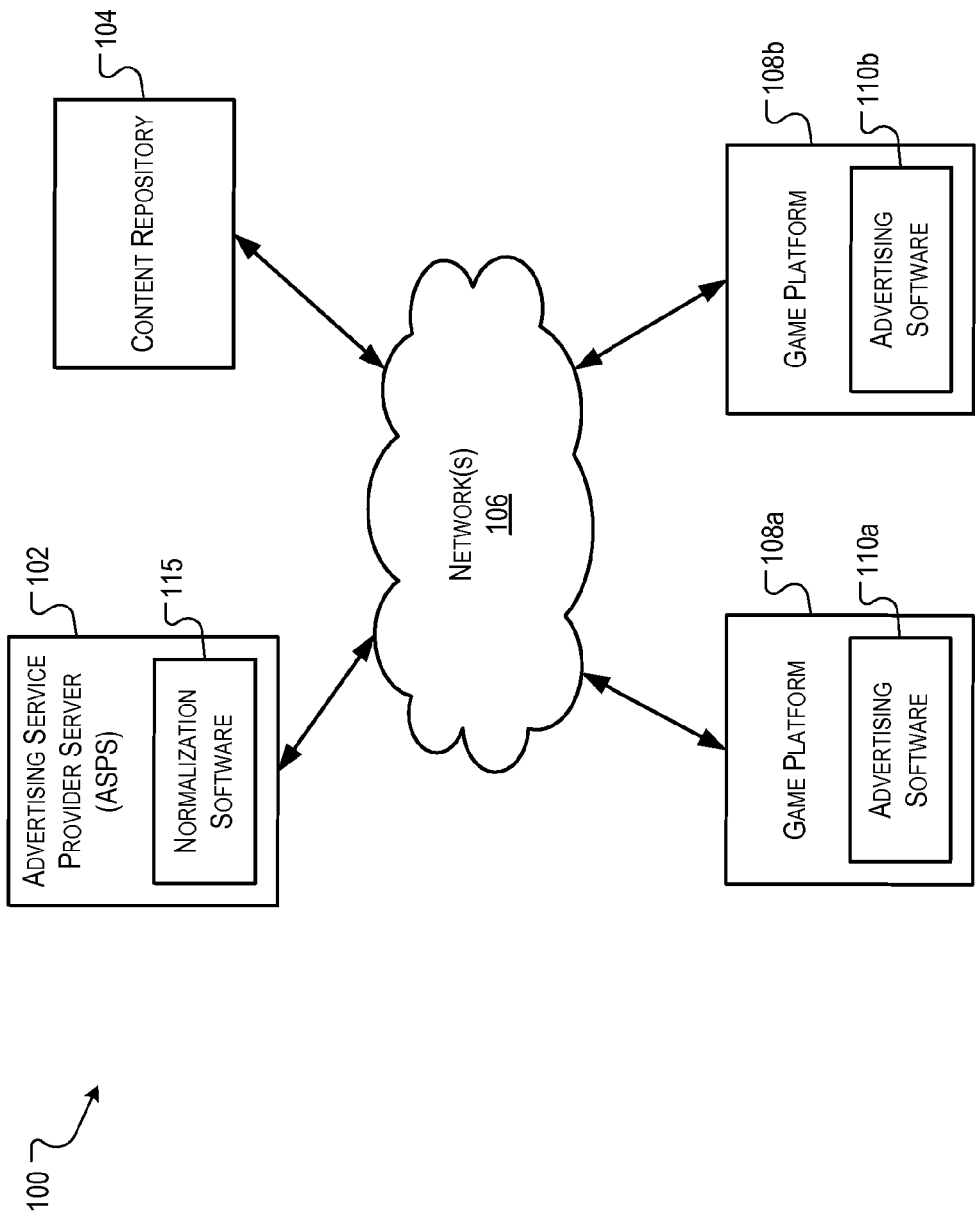
FIG. 1 shows an example advertising system.

FIG. 1 shows an example advertising system 100 for in-game advertising. The system 100 includes an advertising service provider service (ASPS) 102, a content repository 104, and game platforms 108a, 108b, where each is in communication with at least one network 106. According to some implementations, the ASPS 102 can include an advertising service provider server. The ASPS 102 implements one or more content delivery campaigns by uploading content (e.g., advertising content), managing the content, and delivering it to the game platforms 108a, 108b. The ASPS 102 maintains the lists of content placement inventory for each game, and also maintains mappings that identify the location of content placement in games. The ASPS 102 can also collect and manage impression metrics associated with the display of content, and can generate performance reports, billing and payouts.

The ASPS 102 includes a normalization engine (e.g., software) 115 that is operable to identify a reference set of impression data and use the reference set and a normalization function to normalize impression data (e.g., advertising impression data) received from the game platforms 108a, 108b to permit advertisers independent and realistic measurements by which they can compare content, such as advertisements. Content can be uploaded by the ASPS 102 from the content repository 104 over the network(s) 106. While reference is made hereinafter to ad content, other forms of content, including other forms of sponsored content, can be managed by the ASPS 102.

The game platforms 108a, 108b represent devices through which users can play games that include the display of content (e.g., advertisements) provided by the ASPS 102. The game platforms 108a, 108b can include an advertisement engine (e.g., software) 110a, 110b to embed advertisements in games. The advertisement engine 110a, 110b can include an instrumentation element (not shown) that allows for the tracking and logging of advertisement impressions as observed by a user during game play. According to some implementations, these functions are performed by the advertisement engine 110a, 110b. The advertisement engine 110a, 110b facilitates the communication of impressions to the ASPS 102. The game platforms 108a, 108b can include persistent storage to maintain advertising data, for instance, during or across games. Further, the game platforms 108a, 108b can include storage to support local, cached advertisements for presentation within a game.

The one or more networks 106 can include a local area network (LAN), a wide area network (WAN), a virtual private network (VPN), a telephone network, such as the Public Switched Telephone Network (PSTN), an intranet, the Internet, a wireless network, or a combination of networks. The game platforms 108a, 108b can include a networked entertainment device, including gaming consoles such as the Sony Playstation 2 and 3, Microsoft Xbox 360, and Nintendo Wii, network-connected mobile gaming platforms, such as the Nintendo DS, Sony PSP, and the Nokia N-gage, mobile phones, digital set top boxes, entertainment media enabled personal computers and the like.

For the sake of illustration, FIG. 1 shows two game consoles 108a, 108b, a single advertising service provider server 102, and a single content repository 104 connected to the network 106; however, it will be appreciated that in practice there may be only one game console, more game consoles, and/or more ASPSs or content repositories. Additionally, some of the components shown in FIG. 1 can be combined. For instance, the content repository 104 can be included within or as part of the ASPS 102. Additionally, one or more other system components may exist that are not illustrated. For instance, a broker or management entity may act as an intermediary between multiple ASPSs and one or more game platforms, for instance, to manage which ASPSs will deliver content to each one of numerous game platforms.

In operation, the game platforms 108a, 108b execute one or more impression policies to identify when actual impressions (e.g., advertising impressions) occur. An impression policy includes a set of rules or criteria that govern when an 'actual impression' of an in-game advertisement occurs, and can be applied against all possible (i.e., observed) impressions that occur during a game. For instance, an actual impression may be an impression an advertiser is willing to pay for, such as a lengthy and clear display of an advertisement during game play. Other observed impressions may occur during a game that are insufficient to be considered an actual impression. An example may be an ad that is displayed to a user for a brief period of time, or is occluded from a game player's field of vision by another object. In some implementations, the quality of an impression can be rated in accordance with a scale. The scale can define one or more (e.g., plural) different actual impressions that can result in a charge to an advertiser. In some implementations, the quality of the impression can be used to determine the cost to the advertiser.

Example impression criteria include the length of an observed impression (e.g., the length of time in which an ad is displayed), the percentage of screen occupied by the content, the percentage of content occlusion, the quality of the content impression, and the angle of vision from which the content is viewed. Other criteria are possible. Impression criteria can be associated with a minimum (and optionally, a maximum) values that identifies when each criteria is satisfied. When measured display metrics provided by the game platform 108 meet the minimum value (or falls within the minimum and maximum values) for an impression criteria, that criteria is satisfied. In one implementation, an actual impression is identified when a sufficient number or percentage of impression criteria are satisfied.

In some implementations, impression policies including one or more impression criteria may be applied against one or more games. Application of an impression policy to identify when content (e.g., ad) impressions occur in a game is described in U.S. patent application Ser. No. 11/948,619 titled "In-Game Impressions", filed on Nov. 30, 2007 (the "In-Game Impression application"), assigned to the assignee of the present application, the contents of which are incorporated by reference herein as if set forth fully herein.

In some implementations, only actual impressions are reported to the ASPS 102 from a game platform, such as game platform 108a, subsequent to their identification by the game platform 108a. Actual impressions can be received from the game platform 108a in an impression data record. The impression data record can include impression data associated with impression criteria, including display metrics. For instance, the impression data record can include impression data identifying the impression length of an actual impression, the frame rate, the percentage of screen size of an actual impression, the percentage of occlusion, the quality of an actual impression, and the angle of vision of the actual impression. The impression data record can optionally include a tag associated with each actual impression, where the tag uniquely associates the actual impression with the particular impression policy or policies that the impression satisfied.

In other implementations, all possible impressions (i.e., all observed impressions whether or not they constitute actual impressions as defined by impression criteria) are reported to the ASPS 102. In this implementation, an impression data record can include impression data associated with impression criteria for all observed impressions. Observed impressions may be given a 'valid' tag (either by a game platform or by the ASPS 102) that indicates that an observed impression satisfies the impression policy and is thus an 'actual impression'. An 'invalid' tag may be given (either by a game platform or by the ASPS 102) to observed impressions that fail to satisfy the impression policy. The impression data record can also include display metrics, including impression data associated with impression criteria, identification of the impression policy, and/or the validity tag that indicates whether an observed impression satisfies an impression policy.

According to some implementations, the ASPS 102 can receive all possible impressions, and then purge or delete observed impressions from the impression data record that are not actual impressions, i.e., which fail to satisfy their respective impression policy. Other impression data can be included within an impression data record, including, for instance, the identification of the game an impression occurred in, an identity of the advertising content (e.g., by name, publisher, numeral identifier, or the like) that was observed, a time stamp of the observation, and the like.

After one or more impression data records are delivered to the ASPS 102, impression normalization can take place. The impression data record delivered to the ASPS is subjected to impression normalization, which results in the generation of normalized impression data. This normalized impression data is directly comparable with similar impression data from other games and game play instances. In some implementations normalized impression data is stored in normalized data records that correspond to impression data records, such that normalized data can be easily compared to non-normalized data.

Figure 2:
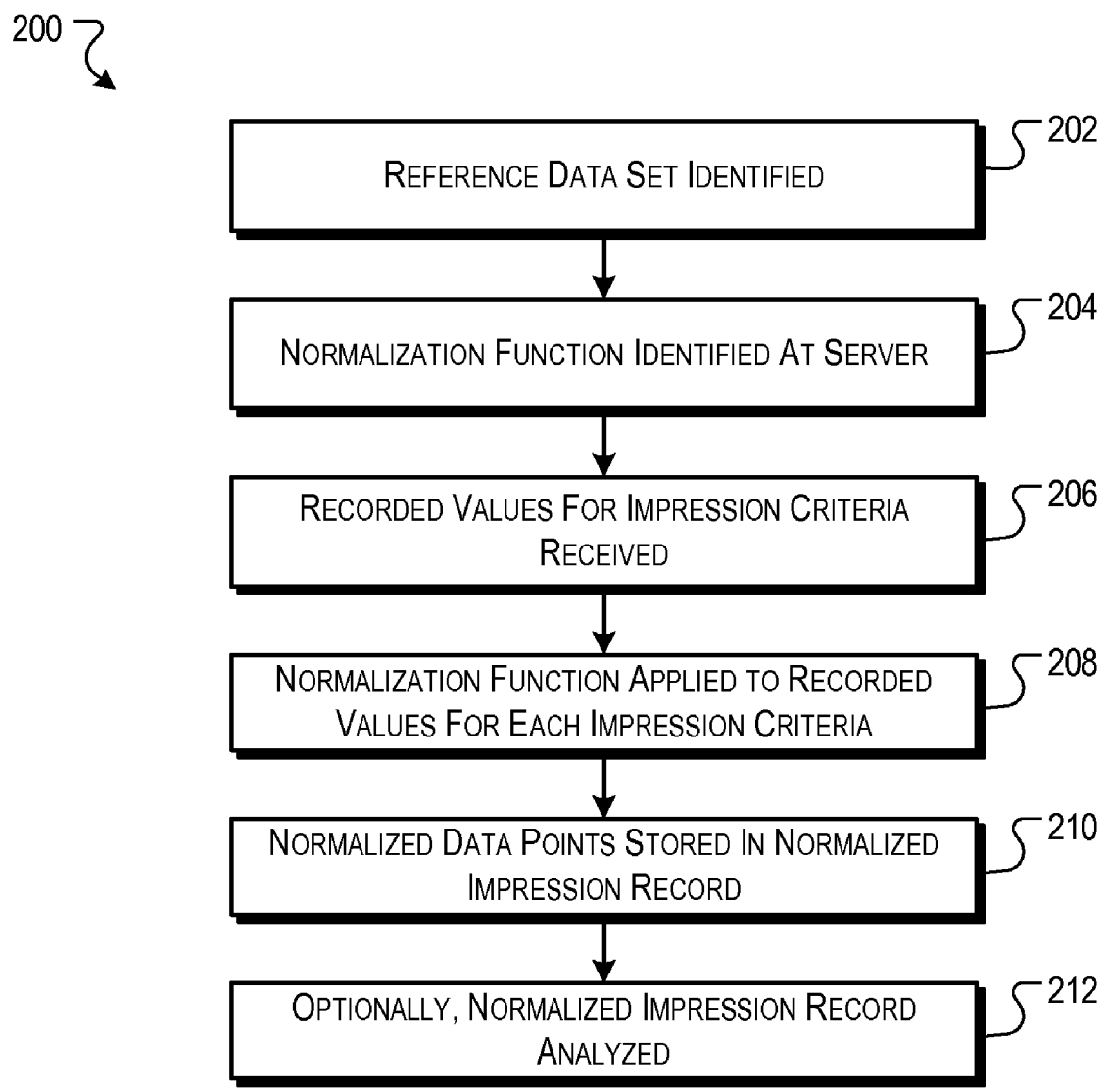
FIG. 2 shows an example normalization process performed in the system of FIG. 1.

FIG. 2 shows an example advertising process 200 performed in the advertising system 100 of FIG. 1. The process 200 starts with the identification of a reference data set 202. The reference data set can be identified, for instance, by the normalization engine 115. The reference data set is used as a known point of reference against which the normalization of all other impression data can occur.

According to an implementation, reference data may come from a manually crafted reference data set based on expected and acceptable average ranges of impression criteria. Acceptable average ranges of impression criteria can be generated by an administrator of the ASPS 102, by one or more advertisers, or by other entities. As an example, a manually crafted reference data set could be explicitly established based on contractual agreements or industry segment agreements on what should constitute an actual impression as identified by impression criteria values.

According to another implementation, the reference data set can be generated using established impression criteria values as described in the In-Game Impression application. According to yet another implementation, the reference data set can be automatically generated, for instance, by the ASPS 102. Automatic generation can occur through capture of impression display metrics during game play (e.g., a sample game play) or through analysis of past performance of impressions.

According to still another implementation, the reference data set can be generated from all observation impressions in an impression data record. For instance, impression data contained within one or more impression data records corresponding to one or more game plays, across one or more different games, and possibly spanning an entire set of recorded data, can be averaged for each impression criteria. The averaging function can be implementation, for instance, by the ASPS 102. The resulting average data values for each impression criteria can be used to generate the reference data set. It will be appreciated that other methods of establishing reference data sets may also be used, including any combination of the above methods.

In cases where the reference data set is generated or calculated based on averaging more than one data point, several averaging methods can used, including a historically weighted average, a strict median determination, a data set mean, or some other averaging method. Once the reference data set is established it is saved as such, for instance, by the ASPS 102. The ASPS 102 and/or other entities, such as advertisers or publishers, can periodically edit the reference data set.

Referring again to FIG. 2, a normalization function 202 is identified 204. For instance, a user-administrator can establish and/or select a normalization function at the ASPS 102.

The ASPS 102 stores the normalization function and applies it to each recorded value 208 within one or more impression data records subsequent to them being received 206 and stored by the ASPS 102. This can occur, for instance, using the normalization engine 110 of the ASPS.

Application of the normalization function to each recorded value in an impression data record 208 results in normalized data values. The normalized data values can be saved in a separate normalized impression record 210. According to some implementations, there is a one-to-one correspondence between data in an impression data record and data in a normalized impression record. Thus, for every criteria data value in the impression data record there will be a resulting normalized value for the same criteria in the normalized data record.

According to some implementations, the normalized data record will include other data associated with the impression data set with which it is associated. In one implementation, only the measured values associated with each criteria are normalized. For instance, the normalized data record can include one or more tags that identify the impression policy applied to one or more impression criteria, one or more tags that identify whether data is associated with an actual impression, the identification of the game an impression occurred in, an identity of the advertising content that was observed, a time stamp of the observation, and the like. Each of these other values will be the same in corresponding impression data records and normalized data records.

Normalized data records can be analyzed for billing, payment, performance analysis, or any other analytics, including further normalization 212. Each normalization data record will reflect consistency with all other normalization data records subjected to the same normalization function and the same reference data set. Therefore the normalized values in each normalized data record have a consistent standard of measure, i.e., all impressions are equal from some the perspective of the reference data set.

An example normalization function will next be described with reference to FIG. 3, which shows an example impression table 300 showing reference values 305, for instance, contained within a reference data set, recorded impression values 306, for instance, contained within an impression data record, and normalized values 308, for instance, contained within a normalized impression record. Each of the reference data, recorded values, and normalized values correspond to one of the impression criteria 310. Impression criteria 310 can include impression length, percentage of screen occluded by ad, percentage of ad occlusion, quality of ad impression, and angle of vision.

Figure 3:
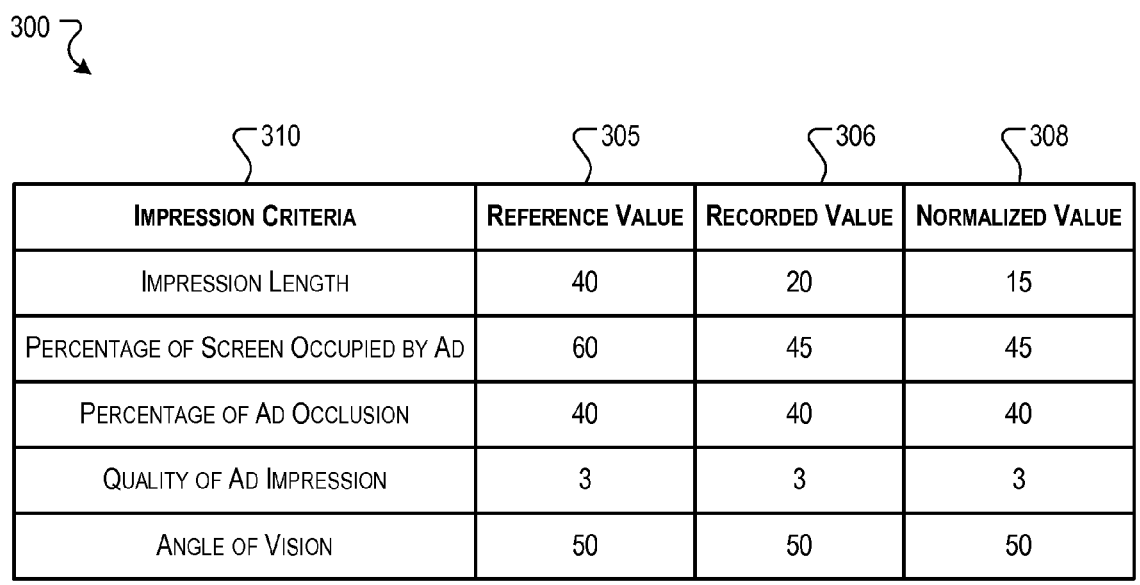
FIG. 3 shows an example impression table representing impression values and normalized impression values.

In one implementation, the example normalization function described with respect to FIG. 3 is one which applies only to impression data associated with a length of impression criteria. Therefore, the normalization function normalizes impression data identifying a length of impression of an impression. According to an illustrative normalization function, the normalized length of an impression, $t_n$, is computed as follows:

$$t_n = \frac{t_{obs}}{2}\left(\frac{(R_{obs} - R_{ref})}{R_{ref}} + \frac{(O_{cref} - O_{cobs})}{O_{cref}} + 2\right)$$

where $R_{ref}$ is the reference value identifying the percentage of screen occupied by an ad, and $R_{obs}$ is the impression data identifying the percentage of screen occupied by the observed ad, as stored in the impression data record. Additionally, $O_{cref}$ is the reference value identifying the percentage of screen occlusion, and $O_{cobs}$ is the impression data identifying the percentage of screen occlusion during display of the observed ad, and $t_{obs}$ is the length of the observed impression as stored in the impression record.

The above example normalization function normalizes the recorded value against the reference value based on other impression criteria, including the percentage of screen occupied by the ad and the percentage of ad occlusion. For instance, as shown in FIG. 3, the reference value has a percentage of screen occupied by ad equal to 60 (for instance, representing 60% of the screen), and the recorded value (of an observed impression) has a percentage of screen occupied of ad equal to 45, representing a 75% value of the reference value or a 25% reduction over the reference value. Applying a linear progression on screen real estate, the impression length of the recorded value, 20 (e.g., 20 seconds), would be normalized by reduced it by 25% of its recorded value. The resulting normalized impression data record would include normalized values that include a normalized value for the percentage of screen occupied by the ad equal to 45, but the normalized value for the impression length would be reduced to 15, equal to 25% of the recorded value.

In the preceding example a linear progression based on the percentage of screen occupied by an ad versus the length of the impression is assumed. In this methodology the ASPS 102 could alter the normalization function by using differing progressions, interpolations and distributions, including logarithmic, linear, Poisson, regular, normal, non-normal and others.

A customized normalization function can also be based on gaming specific criteria, such as game genre, ESRB (Entertainment Software Ratings Board) rating, game platform (PC, game console: Xbox, Play Station, Nintendo, mobile). There can also be interdependencies within the criteria based on several of the impression criteria such that several criteria are used as inputs to normalize another criteria. For example, both the percentage of screen occupied by an ad and the percentage of ad occlusion could impact the impression length. Additionally, because each impression criteria is different, a normalization function can take recorded values and reference values and apply different normalization functions to each of the impression criteria separately. For example, the percentage of screen occupied by an ad may have a direct linear correlation to the impression length while the angle of vision has a Poisson relationship to percentage of ad occlusion.

According to some implementations, the normalization function may be specified through an XML schema that applies to each data criterion separately and jointly. An example XML schema is as follows:

```
<normalization defn>
    <data criterion: name>
        <normalization rule>
            <influencing factors>
                Input criterion: name
                Input criterion: name
                External factor: name
                ...
            </influencing factors>
            <relationships>
                Normalization relationship: plug-in
                relationship routine
            </relationships>
        </normalization rule>
    </data criterion>
    <data criterion: name2>
        .
        .
        .
    </data criterion>
</normalization defn>
```

The normalization function has the purpose of taking the impression data record and the reference data and creating a normalized data record that puts the impression data in the same context as the reference data record. When the normalization occurs can be a business decision on the part of the service provider. For instance, it does not matter whether normalization occurs before or after billing and reporting of advertisements. However, if executed prior to billing and reporting, the ASPS 102 can offer the normalized data to advertisers.

According to some implementations, two tier normalization can be achieved. A first reference data set can be used to normalize impression data on a per-game basis so that all impression data resulting from game plays of the same game are normalized. A second normalization through the normalized data resulting from the first normalization process can occur so that the normalized data can then be normalized against a multi-game reference standard. The second normalization process ensures that different games are all using the same standards of measure. In this instance both the resulting impression data sets can preserved (i.e., the game-normalized data and the multi-game normalized data).

The systems, apparatus, and methods described in this specification may be implemented in computer processing systems including program code including program instructions that are executable by the computer processing system, which may be made up of one or more computers at one or more locations. Other implementations may also be used.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine-generated electrical, optical, or electromagnetic signal, that is generated to encode information for transmission to suitable receiver apparatus for execution by a computer. The computer readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method, comprising:
    identifying impression data associated with display of content during execution of at least one game, the impression data including respective display values for a plurality of display metrics characterizing each appearance of the content during the at least one game;
    identifying a normalization function for a first display metric among the plurality of display metrics, the normalization function scales the respective display value for the first display metric based at least on the respective display value for two other display metrics among the plurality of display metrics, the two other display metrics being different from the first display metric; and
    generating, by a processor, normalized impression data based on application of the normalization function to the identified impression data, where the normalized impression data represents a normalized occurrence of impressions and includes at least a respective normalized value for the first display metric for each appearance of the content during the at least one game.

2. The method of claim 1, further comprising identifying a reference set of data, and wherein generating the normalized impression data based on the application of the normalization function to the identified impression data comprises:
    generating normalized impression data based on the application of the normalized function to the identified impression data, the application of the normalized function based at least in part on the reference set of data.

3. The method of claim 1, wherein the plurality of display metrics include two or more of impression length, percentage of screen occupied by the content, percentage of content occlusion, quality of the content impression, and angle of vision.

4. The method of claim 1, further comprising generating a report, the report including the generated normalized impression data.

5. The method of claim 1, wherein:
    the first display metric is an impression length metric, and the two other display metrics includes a second display metric and a third display metric, the second display metric for measuring a percentage of screen occupied by the content during each appearance of the content, and the third display metric for measuring a percentage of content occlusion during each appearance of the content; and the normalization function scales a display value of the impression length metric for each appearance of the content based on respective reference values and respective display values of the second and third display metrics.

6. The method of claim 5, wherein:
the normalization function scales the display value of the impression length metric according to a formula, $$t_n = \frac{t_{obs}}{a}\left(\frac{(R_{obs} - R_{ref})}{R_{ref}} + \frac{(O_{cref} - O_{cobs})}{O_{cref}} + c\right),$$

where $t_n$ is a normalized value of the impression length metric, $t_{obs}$ is the display value of the impression length metric, $R_{obs}$ is the display value of the second display metric, $R_{ref}$ is the reference value of the second display metric, $O_{obs}$ is the display value of the third display metric, $O_{cref}$ is the reference value of the third display metric, and a and c are each a constant number.

7. A system, comprising:
one or more processors; and
memory having instructions stored thereon, the instructions, when executed by the one or more processors, cause the processors to perform operations comprising:
identifying impression data associated with display of content during execution of at least one game, the impression data including respective display values for a plurality of display metrics characterizing each appearance of the content during the at least one game;
identifying a normalization function for a first display metric among the plurality of display metrics, the normalization function scales the respective display value for the first display metric based at least on the respective display value for two other display metrics among the plurality of display metrics, the two other display metrics being different from the first display metric; and
generating normalized impression data based on the application of the normalization function to the identified impression data, where the normalized impression data represents a normalized occurrence of impressions and includes at least a respective normalized value for the first display metric for each appearance of the content during the at least one game.

8. The system of claim 7, wherein the operations further comprise for identifying a reference set of data, and wherein generating the normalized impression data based on the application of the normalization function to the identified impression data comprises:
generating normalized impression data based on the application of the normalized function to the identified impression data, the application of the normalized function based at least in part on the reference set of data.

9. The system of claim 7, wherein the plurality of display metrics include two or more of impression length, percentage of screen occupied by the content, percentage of content occlusion, quality of the content impression, and angle of vision.

10. The system of claim 7, wherein the operations further comprise generating a report, the report including the generated normalized impression data.

11. The system of claim 7, wherein:
the first display metric is an impression length metric, and the two other display metrics includes a second display metric and a third display metric, the second display metric for measuring a percentage of screen occupied by the content during each appearance of the content, and the third display metric for measuring a percentage of content occlusion during each appearance of the content; and
the normalization function scales a display value of the impression length metric for each appearance of the content based on respective reference values and respective display values of the second and third display metrics.

12. The system of claim 11, wherein:
the normalization function scales the display value of the impression length metric according to a formula, $$t_n = \frac{t_{obs}}{a}\left(\frac{(R_{obs} - R_{ref})}{R_{ref}} + \frac{(O_{cref} - O_{cobs})}{O_{cref}} + c\right),$$

where $t_n$ is a normalized value of the impression length metric, $t_{obs}$ is the display value of the impression length metric, $R_{obs}$ is the display value of the second display metric, $R_{ref}$ is the reference value of the second display metric, $O_{cobs}$ is the display value of the third display metric, $O_{cref}$ is the reference value of the third display metric, and a and c are each a constant number.

13. A non-transitory computer-readable medium having instructions stored thereon, the instructions, when executed by one or more processors, cause the processors to perform operations comprising:
identifying impression data associated with display of content during execution of at least one game, the impression data including respective display values for a plurality of display metrics characterizing each appearance of the content during the at least one game;
identifying a normalization function for a first display metric among the plurality of display metrics, the normalization function scales the respective display value for the first display metric based at least on the respective display value for two other display metrics among the plurality of display metrics, the two other display metrics being different from the first display metric; and
generating normalized impression data based on the application of the normalization function to the identified impression data and includes at least a respective normalized value for the first display metric for each appearance of the content during the at least one game.

14. The computer-readable medium of claim 13, wherein the operations further comprise identifying a reference set of data, and wherein generating the normalized impression data based on the application of the normalization function to the identified impression data comprises:
generating normalized impression data based on the application of the normalized function to the identified impression data, the application of the normalized function based at least in part on the reference set of data.

15. The system computer-readable medium of claim 13, wherein the plurality of display metrics include two or more of impression length, percentage of screen occupied by the content, percentage of content occlusion, quality of the content impression, and angle of vision.

16. The computer-readable medium of claim 13, wherein the operations further comprise generating a report, the report including the generated normalized impression data.

17. The computer-readable medium of claim 13, wherein:
the first display metric is an impression length metric, and the two other display metrics includes a second display metric and a third display metric, the second display metric for measuring a percentage of screen occupied by the content during each appearance of the content, and the third display metric for measuring a percentage of content occlusion during each appearance of the content; and the normalization function scales a display value of the impression length metric for each appearance of the content based on respective reference values and respective display values of the second and third display metrics.

18. The computer-readable medium of claim 17, wherein:
the normalization function scales the display value of the impression length metric according to a formula, $$t_n = \frac{t_{obs}}{a}\left(\frac{(R_{obs} - R_{ref})}{R_{ref}} + \frac{(O_{cref} - O_{cobs})}{O_{cref}} + c\right),$$

where $t_n$ is a normalized value of the impression length metric, $t_{obs}$ is the display value of the impression length metric, $R_{obs}$ is the display value of the second display metric, $R_{ref}$ is the reference value of the second display metric, $O_{cobs}$ is the display value of the third display metric, $O_{cref}$ is the reference value of the third display metric, and a and c are each a constant number.

* * * * *

UNITED STATES PATENT AND TRADEMARK OFFICE
CERTIFICATE OF CORRECTION

| | | |
|---|---|---|
| PATENT NO. | : 8,235,814 B2 | Page 1 of 1 |
| APPLICATION NO. | : 12/334014 | |
| DATED | : August 7, 2012 | |
| INVENTOR(S) | : Willis et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 517 days.

Signed and Sealed this
Eighteenth Day of December, 2012

David J. Kappos
*Director of the United States Patent and Trademark Office*

UNITED STATES PATENT AND TRADEMARK OFFICE
CERTIFICATE OF CORRECTION

PATENT NO. : 8,235,814 B2  Page 1 of 1
APPLICATION NO. : 12/334014
DATED : August 7, 2012
INVENTOR(S) : Daniel Willis It is certified that error appears in the above-identified patent and that said Letters Patent is hereby corrected as shown below:

In the Claims:

Column 11, Line 18, Claim 6; replace:
"the reference value of the second display metric, $O_{obs}$ is the" with
-- the reference value of the second display metric, $O_{cobs}$ is the --

Column 11, Line 48, Claim 8; replace:
"compromise for identifying a reference set of data, and wherein" with
-- compromise identifying a reference set of data, and wherein --

Column 12, Line 57, Claim 15; replace:
"15. The system computer-readable medium of claim 13," with
-- 15. The computer-readable medium of claim 13, --

Signed and Sealed this
Sixteenth Day of April, 2013

Teresa Stanek Rea
*Acting Director of the United States Patent and Trademark Office*